H. R. RICARDO.
AIRCRAFT DRIVING MECHANISM.
APPLICATION FILED OCT. 10, 1917.
1,306,125.  Patented June 10, 1919.
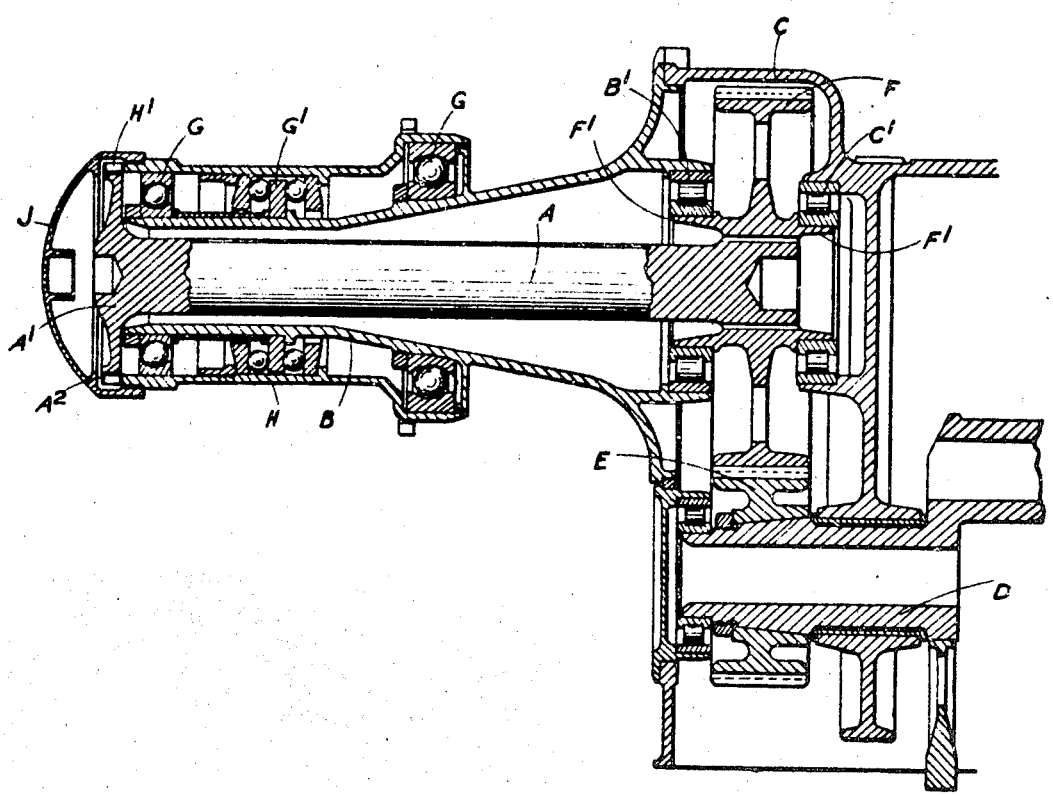

UNITED STATES PATENT OFFICE.

HARRY RALPH RICARDO, OF LONDON, ENGLAND.

AIRCRAFT DRIVING MECHANISM.

1,306,125.   Specification of Letters Patent.   Patented June 10, 1919.

Application filed October 10, 1917. Serial No. 195,853.

*To all whom it may concern:*

Be it known that I, HARRY RALPH RICARDO, a subject of the King of England, residing at London, in England, have invented certain new and useful Improvements in Aircraft Driving Mechanism, of which the following is a specification.

This invention relates to the driving of air propellers and methods of mounting the same and has for its object to relieve the driving shaft of all stresses except pure torsion and to avoid undesirable torsional variations in the crank shaft.

In multicylinder engines and especially those in which either six or twelve cylinders are employed trouble is constantly experienced owing to torsional vibrations in the crank shaft. Such vibrations are serious in that at certain periodic speeds they cause the whole engine to vibrate excessively and if these speeds are maintained for any length of time fracture of the crank shaft due to fatigue is likely to take place. Such periodic vibrations occur when one end of the crank shaft is constrained to revolve at a constant angular velocity while the other end is free to wind up as it were when the pressure is applied and to unwind or fly back when it is relieved. When a propeller is mounted directly on one end of a crank shaft or is directly geared to it, it is apparent that the angular velocity of this end of the shaft will be practically uniform owing to the great momentum of the propeller. Where the propeller is mounted on a lay shaft of ordinary construction which is geared to the crank shaft the irregularity in angular velocity at one end of the crank shaft and the substantially uniform angular velocity at the propeller tends to give rise to chattering of the gears. This disadvantage is overcome by the present invention.

Further, it is desirable to relieve the driving shaft of all stresses except pure torsion whether this be an extension of the crank shaft itself or a lay shaft driven by gearing from the crank shaft. The present construction attains this end.

According to this invention a separate resilient or floating driving shaft is provided one end of which is coupled to the propeller hub which is carried independently on a bearing while the other end of the separate shaft is either directly connected to the engine crank shaft through a coupling or is driven therefrom through gearing. The propeller hub is mounted on a hollow bearing which preferably takes the form of a nose piece the bearing being so arranged that the thrust and any strains due to lack of balance in the propeller are taken up by the nose piece. One end of the resilient shaft lies within this hollow bearing or nose piece and is coupled to one end of the propeller hub around the end of the bearing. The angular twist that normally occurs in the crank shaft is thus transferred to the resilient shaft so that both ends of the crank shaft are substantially allowed free play. Moreover, since the resilient or torsion shaft is relieved of all other stresses as, for instance, those due to reciprocating masses this shaft can be made proportionately smaller than the crank shaft and designed so that all or the greater part of the annular twist which tends to occur in the whole length of shafting shall be confined to the resilient length of shaft. As this resilient shaft can be constructed of uniform section throughout its length the torsional stresses to which it is subjected are distributed evenly throughout its length. Since this shaft has no other duty to perform except to transmit the drive it may be made of such material as is best suited to resist fatigue, as for example, vanadium steel. By using such a resilient or floating shaft and mounting the propeller in the above described manner risk of damage in the event of failure of the resilient shaft is avoided and if such breakage occurs the propeller cannot break away and it is possible to quickly and cheaply replace the separate shaft length.

The accompanying drawing illustrates by way of example one construction and arrangement of floating shaft according to this invention and also one method of mounting the propeller.

The drawing is a longitudinal sectional elevation through the floating shaft the propeller hub and the end of the crank shaft the latter being geared to one end of the floating shaft.

A plain straight length of shafting A is disposed within a hollow nose piece or bracket or bearing B of suitable length and construction the nose piece being mounted so as to project from the end of the casing C which incloses the crank shaft D and the gear wheels E and F. The gear wheel E is mounted on the crank shaft D while the gear wheel F is mounted on one end of the resilient or torsion shaft A. This end of the shaft A is carried in bearings disposed on either side of the gear wheel F. In the preferred construction this wheel is provided with hollow projections F' on either face of its hub and these projections lie in bearings of which one, C', is formed in the crank casing C while the other B' is formed in the inner end of the nose piece B. The end of the shaft A thus need only be connected to the gear wheel F by means of teeth or projections formed on the two parts which are in engagement and the shaft does not directly rest in bearings at this end and in this construction may be said to float between the gear wheel F and the hub of the propeller. The gear wheel may be keyed on the end of the shaft A, but by suitable shaping of the end of the shaft and the interior of the hub of the gear wheel these parts can be caused to engage so as to transmit the drive while permitting the shaft to be readily removed when necessary.

Along the length of the nose piece B are provided rotational and thrust bearings G G' for the hub H of the propeller. On the outer end of the shaft A is formed, preferably integral with it, a disk A' the periphery of which is provided with projections or teeth $A^2$ adapted to engage corresponding projections H' formed on the outer end of the propeller hub H. A cap J is conveniently employed to close in the end of the shaft A and the connection between it and the hub H, this cap being carried by the propeller hub.

It will thus be apparent that the shaft A is so connected at either end to the propeller hub and gear wheel respectively that it constitutes a resilient and practically floating element for transmitting the drive between the crank shaft D and the propeller hub H. The separate shaft A can thus be constructed as best suited to withstand the torsional strains to which it will be subjected and which it is intended to undergo. The shaft A thus, in effect, constitutes a spring or yielding member in the drive which allows such irregular movements as may occur in the rotation of the crank shaft to take place without unduly straining the latter. Any torsional oscillations or vibrations set up in the crank shaft thus tend to be eliminated or damped out in the shaft A. The length of the shaft A is also such as to insure that the teeth of the gear wheels E and F will always bear against each other in one direction irrespective of any unevenness in the turning moment.

By mounting the propeller in the manner described the fixed nose piece B which is preferably constructed of steel takes the whole of the thrust and also any bending moment that may result from lack of balance in the propeller or from any accidental cause. The resilient shaft is also in this way completely relieved of all stresses except pure torsion.

Where it is not desirable to drive the propeller through gearing the end of the shaft A is connected to the end of the crank shaft D by some convenient form of coupling. For example, the end of the shaft A may be provided with projections or teeth adapted to engage corresponding projections or teeth formed on the end of the crank shaft. With such a construction the end of the shaft A adjacent to the end of the crank shaft is carried in bearings distinct from those which carry the end of the crank shaft. Thus the floating nature of the shaft A may be preserved. Other forms of coupling may however be employed.

The details of construction may be modified to meet requirements.

What I claim as my invention and desire to secure by Letters Patent is:—

1. Aircraft driving mechanism, including in combination, a casing, a crank shaft therein, a hollow nose piece rigidly carried by said casing, a propeller hub rotatably mounted on said piece and held against axial movement, a separate resilient floating shaft disposed within said piece, means loosely connecting one end of said latter shaft with the crank shaft and means loosely connecting the other end to said hub.

2. Aircraft driving mechanism, including in combination, a casing, a crank shaft therein, a hollow nose piece rigidly carried by said casing, a propeller hub rotatably mounted on said piece and held against axial movement, a separate resilient floating shaft disposed within said piece, a gear train rotatably connecting said shafts, means loosely connecting one end of the floating shaft to a gear of said train, and means loosely connecting the other end to said hub.

3. Aircraft driving mechanism, including in combination, a casing, a crank shaft therein, a hollow nose piece rigidly connected to said casing, a propeller hub rotatably mounted on said piece and held against axial movement, a gear on said crank shaft, a second gear meshing with said gear rotatably mounted within said piece, a separate resilient floating shaft also disposed within said piece, means loosely connecting one end of said floating shaft with said second gear and means loosely connecting the other end to said hub.

In testimony whereof I have signed my name to this specification in the presence of two subscribing witnesses.

HARRY RALPH RICARDO.

Witnesses:
E. PASK,
R. BAGGATT.